June 15, 1965  NILS-ÅKE BJÄRESTEN  3,189,831
MULTI-STABLE FLIP-FLOP CIRCUIT FOR GENERATING RECTANGULAR
PULSES FROM AN ALTERNATING CURRENT CONTROL VOLTAGE SOURCE
Filed June 11, 1962

INVENTOR.
Nils-Åke Bjäresten
BY

United States Patent Office 3,189,831
Patented June 15, 1965

3,189,831
MULTI-STABLE FLIP-FLOP CIRCUIT FOR GENERATING RECTANGULAR PULSES FROM AN ALTERNATING CURRENT CONTROL VOLTAGE SOURCE
Nils-Åke Bjäresten, Jonkoping, Sweden, assignor to Allmanna Svenska Elektriska Aktiebolaget, Vasteras, Sweden, a corporation of Sweden
Filed June 11, 1962, Ser. No. 201,732
Claims priority, application Sweden, June 15, 1961, 6,245/61
2 Claims. (Cl. 328—13)

The present invention relates to a multi-phase switch connection (flip-flop circuit) for generating rectangular pulses having the same frequency and phase number as, and a phase position corresponding to a given control voltage.

With static converters, for example, a pulse generator is desired which with the aid of a multi-phase alternating voltage of some sort generates a multi-phase alternating voltage having rectangular pulses.

The present invention provides such a pulse generator in the form of a multi-phase switching circuit for generating rectangular pulses by means of some kind of multi-phase control voltage. A switching circuit according to the invention comprises a number of controlled switching devices, such as transistors, electron tubes or the like, corresponding to the phase number of the control voltage, which devices are fed across loads from a common direct voltage source, and the different phases of the control voltage are connected through diodes to the control electrodes of said devices, while the output phase voltages of the circuit are taken out from the said loads. Further, the said control electrodes of each device are connected to the said output voltages from all the other devices, whereby the connection to the output voltage of the member of the preceding phase goes through the corresponding one of said diodes.

With such a circuit each switching device will be blocked when the polarity of the corresponding phase of the control voltage alters from unblocking to blocking polarity for the corresponding diode, and the device will remain blocked unil the device in the subsequent phase is blocked. In this way one of the said switching devices will always be blocked while all the others will be conducting.

The circuit according to the invention is particularly simple in the three-phase form and with transistors as switching devices, the base electrode of each transistor being connected through a resistor to the collector of the transistor in the subsequent phase and through its corresponding diode to the collector of the transistor in the preceding phase.

Figure 1:
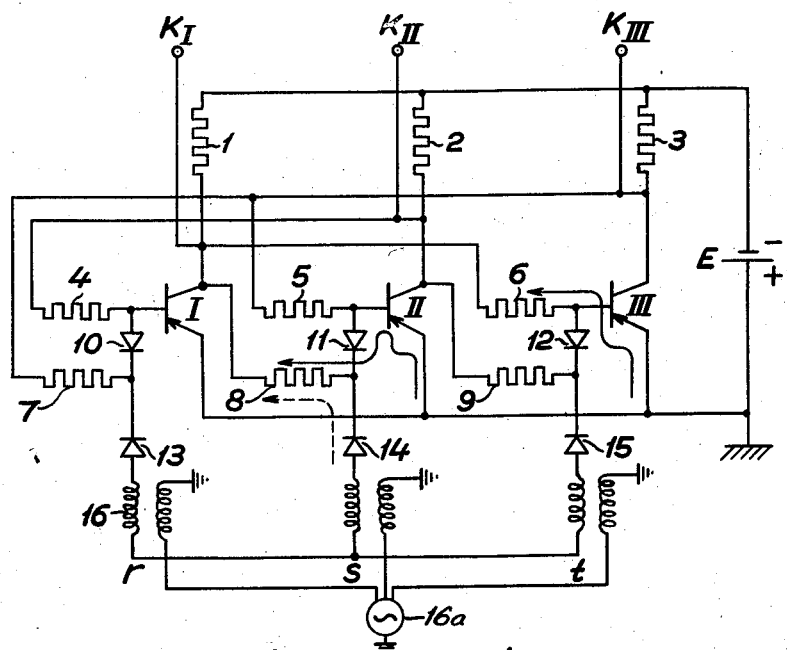
Figure 2:
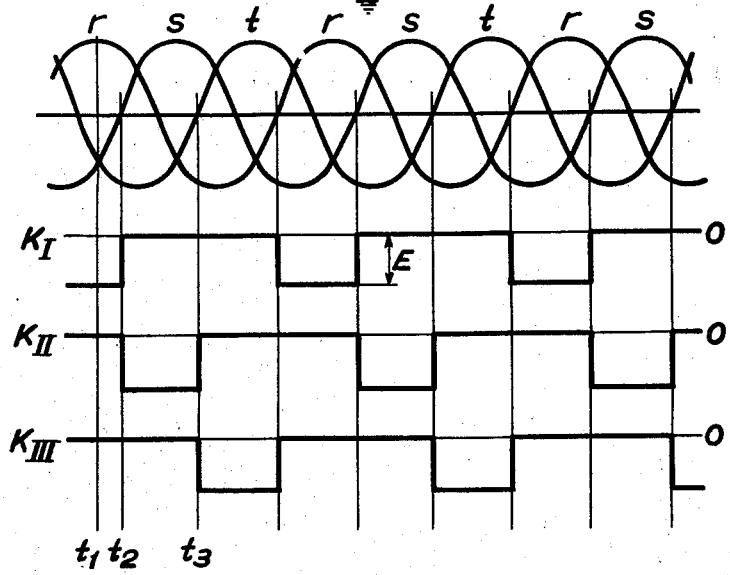

The invention will be described in more detail with reference to the accompanying schematical drawing where FIGURE 1 shows a three-phase circuit according to the invention whereas FIGURE 2 shows voltage curves for the controlling input voltage and the output voltage of the generator.

The generator shown in FIGURE 1 comprises three parallel-connected transistors I, II and III in that phase sequence, fed from a common direct voltage source E, each via its own resistor 1, 2, 3 and controlled by a control voltage $r$, $s$, $t$, which is here indicated as coming from the secondary winding 16 of a transformer connected to an alternating current control voltage source 16a. The base of each transistor is connected via a resistor 4, 5, 6, to the collector of the transistor in the subsequent phase. Further, each transistor base is connected via diodes 10, 11, 12, respectively, to the phases $r$, $s$, $t$, of the control voltage and via other resistors 7, 8, 9, respectively to the collector of the transistor in the preceding phase. The output voltage of the generator is taken out from terminals $K_I$, $K_{II}$ and $K_{III}$ as the collector voltage in the different transistors.

In order to coordinate the potential of the feeding voltage E in relation to the control voltage $r$, $s$, $t$, the positive pole of the feed voltage E and the zero point of the transformer winding 16 are grounded. To prevent current rush in the control circuits, diodes 13, 14, 15 have been inserted.

When the feeding voltage E and the control voltage $r$, $s$, $t$ are connected, a certain building-up process takes place, but, after approximately one period of the control voltage, this has finished, and a stationary periodic condition is obtained where at a certain moment the currents of the circuit flow as indicated by the unbroken arrows. The moment corresponds to the moment $t_1$ in FIGURE 2.

At the moment $t_1$ the voltage $r$ is positive while the voltages $s$ and $t$ are negative and the diode 10 is blocked. The base current in the transistor I is zero with the consequence that the collector current also is zero. The collector voltage $K_I$ will thus be negative. Since the phases $s$ and $t$ are negative in relation to the earth potential, the rectifiers 14 and 15 are blocked. Through the base circuit of transistor II, rectifier 11 and resistor 8 a base current flows towards the point $K_I$, which means that the transistor II will be conducting and the collector voltage $K_{II}$ consequently almost zero. In the transistor III a base current flows through the resistor 6 to the collector $K_I$. This transistor is therefore also conducting and the potential in the point $K_{III}$ will also be almost zero. This state is clear from FIGURE 2.

At the moment $t_2$ the input voltages become positive with the result that the rectifier 14 will be conducting. Because of this voltage increase the base current through the transistor II and rectifier 11 commutates to rectifier 14, and rectifier 11 is blocked. Since the voltage at point $K_{III}$ is equal to zero the transistor II no longer receives a base current and the transistor is thus blocked. The point $K_{II}$ will then be negative. This in turn causes a base current to flow through transistor I and resistor 4 to point $K_{II}$ so that this transistor will be conducting and establishes the potential zero in the point $K_I$. For the transistor III this means that the base current which previously flowed through resistor 6 to $K_I$ will be zero, but in return the base current can flow via rectifier 12, resistor 9, to the negative point $K_{II}$ so that transistor III will still be conducting.

This state will be stable to the moment $t_3$ when the voltage $t$ becomes positive. The whole process described above will then be repeated, but with a displacement of one phase i.e. the transistor III is blocked, transistor II becomes conducting and transistor I remains conducting but with another base current path.

A periodic process will thus be developed and it is clear from FIGURE 2 that each transistor will be leading for 240 electrical degrees and blocked for 120 electrical degrees. A multi-phase pulsing alternating voltage with marked rectangular curve shape will thus be produced, which as mentioned above is particularly desirable for the control of static converters.

I claim:
1. In combination with an alternating current control voltage source, a multi-phase switching circuit for generating rectangular pulses having the same frequency and phase number as, and a phase position corresponding to, said control voltage source, comprising a plurality of controlled switching devices, the number of switching devices being equal to the number of phases of the control voltage, each switching device having an output terminal and a control electrode, a common direct-current voltage source, first connecting means connecting the direct-cur- rent voltage source to the output terminals of each of the switching means, resistance means in said first connecting means beween the direct-current voltage source and the output terminals, second connecting means connecting the control voltage source to the control electrodes of each of said switching devices, diodes in said second connecting means between the control voltage source and each of the control electrodes, the output phase voltages of the connection being taken from the output terminals of the switching devices, third connecting means connecting the control electrode of each switching device to the output terminal of the switching device of the next succeeding phase, and fourth connecting means connecting the control electrode of each switching device to the output terminal of the next preceding phase, each of said fourth connecting means including the diode in the second connecting means of the later of the two connected phases and the impedance of the whole connection being substantially resistive.

2. A circuit as claimed in claim 1 in which the number of phases is three, the switching devices comprising transistors, the base electrode of each transistor comprising the control electrode and the collector electrode comprising the output terminal, and a resistance in each of said third connecting means.

References Cited by the Examiner

UNITED STATES PATENTS

| | | | |
|---|---|---|---|
| 2,594,092 | 4/52 | Taylor | 328—205 |
| 2,777,067 | 1/57 | Higby | 307—88.5 X |
| 2,984,753 | 5/61 | Della Salle | 307—88.5 |
| 3,051,907 | 8/62 | Carroll | 328—205 |
| 3,070,713 | 12/62 | Leightner | 307—88.5 |

ARTHUR GAUSS, *Primary Examiner.*

GEORGE N. WESTBY, JOHN W. HUCKERT,
*Examiners.*